Nov. 16, 1971    L. NEEDLEMAN    3,619,920
DISTRIBUTION OF FOOD IN AN EATERY
Filed Aug. 22, 1968
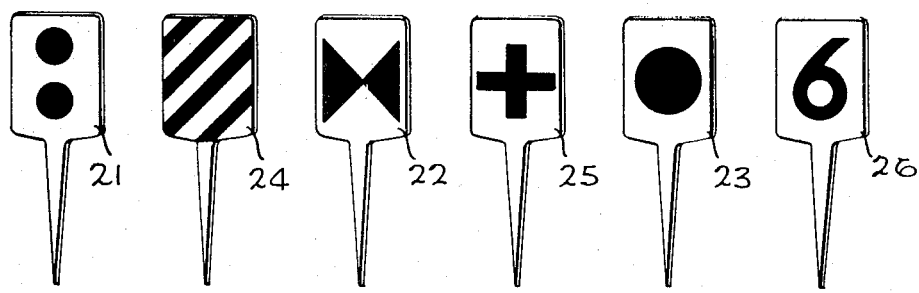
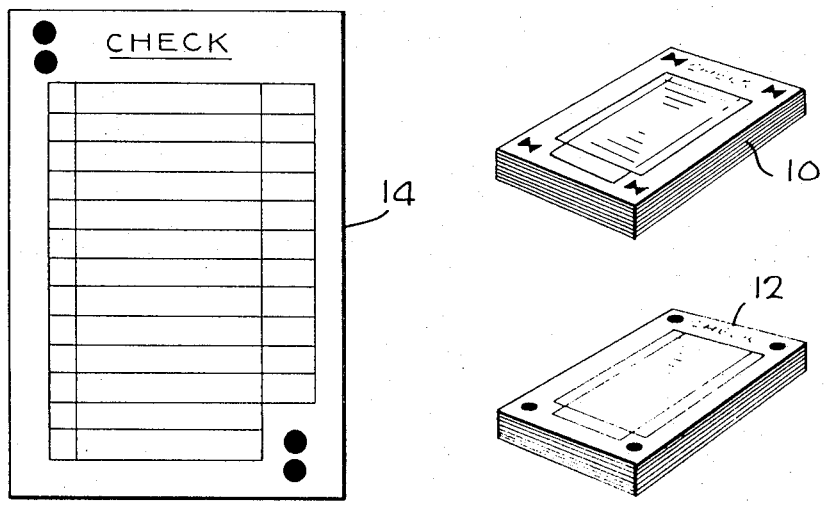
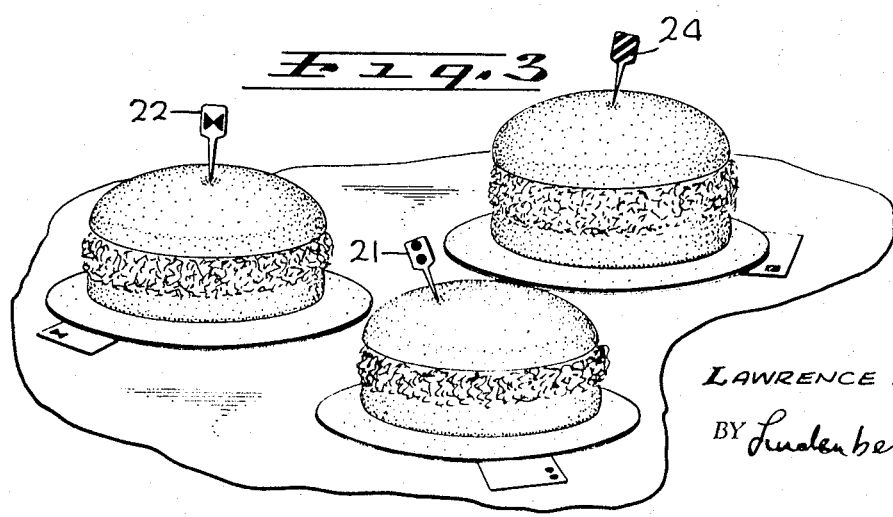
INVENTOR.
LAWRENCE NEEDLEMAN
BY Lindenberg & Freilich
ATTORNEYS

United States Patent Office 3,619,920
Patented Nov. 16, 1971

3,619,920
DISTRIBUTION OF FOOD IN AN EATERY
Lawrence Needleman, 1300 N. Larrabee,
Los Angeles, Calif. 90069
Filed Aug. 22, 1968, Ser. No. 754,702
Int. Cl. A44c *3/00*
U.S. Cl. 40—2 G
2 Claims

ABSTRACT OF THE DISCLOSURE

A plurality of multi-page order books, each page in the same book bearing a waitress-identifying indicium and a like number of sets of indicium-bearing flages, each set being associated with a corresponding order book, and each flag therein bearing the same indicium carried by each page in the corresponding book. A waitress records a food order on a page bearing her indicium. After the order is filled a flag with her indicium is placed on top of the ordered food which is viewable from a significant distance.

BACKGROUND OF THE INVENTION

(1) Field of the invention

The present invention relates to means for and an improved method of distributing goods, which are distributable from a central location, in accordance with orders of goods received from a plurality of order takers. More particularly, the invention relates to means for and an improved method of receiving orders of food, communicating them for filling from a common source, and for distributing the filled orders to the food requestors.

(2) Description of the prior art

The present invention finds particular application in the distribution of food, ordered in eateries, such as coffee shops and the like, and therefore, hereafter, it will be described in such a context. However, as will become apparent from the following description, the teachings may be employed in other analogous applications.

Although many innovations have been made in the coffee shop and restaurant business, the innovations are generally limited to food preparation, kitchen equipment, furniture, decor and other like aspects. Very little change, if any, has occurred in the method by which food is ordered and distributed. Typically a waitress records the food which is ordered by a party of one or more people on a page, often referred to as a check, torn out of an order book. The check is then placed, following previously placed checks, on a check wheel or rack located on a counter top or kitchen window, for use by the cook. After the food order is filled, the filled plate or plates are placed on top of the check on the check-out counter or window. The waitress's name is then called out to accept the plates and serve them to the proper party. To identify the waitress, a specific location is generally provided on each check, wherein the waitress typically writes and, more often, scribbles an illegible identification number or signs it hurriedly.

Anyone who frequents such eateries is aware of the inevitable confusion which occurs near the check-out counter, particularly during busy eating hours. Since each waitress is generally in charge of a large number of tables, she is often busy with one party while her name is called out. Consequently, she often does not hear her name. Quite often her name is drowned in the noise which typifies such eating places. As a result, food, ready for pick-up is often over-looked. Also, in the rush to serve the food as fast as possible, waitresses often pick up orders belonging to other waitresses, serving them to the wrong party. Although many attempts have been made to eliminate such confusion, these attempts have not achieved their attended goals. Thus, an obvious need exists for simple means, and particularly for an improved method of distributing food in an eatery, in a most efficient, simple and unconfusing manner as possible. Furthermore, since cost is of paramount consideration in the food business, such means and method should not require any significant expediture in material or manhours.

OBJECTS AND SUMMARY OF THE INVENTION

It is a primary object of the present invention to provide simple, inexpensive means for use in the distribution of ordered goods which are distributable from a central location where orders received from a plurality of order takers, are filled.

Another object of the invention is to provide an improved method of distributing goods, which are ordered from a plurality of order takers, the orders being filled at a central location.

A further object is the provision of an improved method of distributing, from a common kitchen, food which is ordered from a plurality of waitresses by customers in an eatery, with maximum efficiency.

Still a further object is the provision of simple, very inexpensive means used to minimize confusion and improper serving of ordered food to customers in an eatery.

These and other objects of the invention are achieved by providing in an eatery, each waitress with a multi-check order book, in which each page or check carries an easily seen indicium, which identifies the waitress. The indicium, which may assume the form of a geometric configuration, a symbol, number or any other pattern, may be located at one or more corners of the check so that a mere glimpse would suffice to recognize it.

The means of the invention further include sets of elements, each set consisting of a plurality of elements carrying a different waitress-identifying indicium. Each element may be shaped as an indicium-carrying flag which can be placed on top of a food-filled plate or attached thereto.

In accordance with the method of the present invention, a waitress, after recording the food which is ordered on a check, carrying her identifying indicium, places it at the kitchen counter as in the prior art. After the order is filled, the cook or the food distributor places, on the plate, a flag carrying the same indicium as that shown on the check. The plate with the flag thereon is then placed on the pick-up counter for pick-up by the waitress.

The flags are preferably large enough so that the indicia thereon are easily seen by the waitresses from significant distances. Consequently, a waitress, by merely glancing at the pick-up counter can determine whether any of the filled orders belongs to her for pick-up. Therefore, the need for calling out waitresses name is eliminated, resulting in a reduction in the noise in the place. Furthermore, as the waitress approaches the counter, the indicia on the flags help her select her orders only, thereby greatly reducing the likelihood that she will pick up a wrong order.

The novel features of the invention are set forth with particularity in the appended claims. The invention will best be understood from the following description when read in conjunction with the accompanyng drawings.

BRIEF DESCRIPTION OF THE DRAWINGS

FIG. 1 is an isometric view of a plurality of order books and a front view of a page or check of an order book in accordance with the present invention;

FIG. 2 is a diagram of a plurality of flag-like elements carrying different waitress-identifying indicia; and FIG. 3 is a diagram useful in pointing out advantages realizable when practicing the teachings of the present invention.

DESCRIPTION OF THE PREFERRED EMBODIMENTS

Referring to FIG. 1, therein numerals 10 and 12 designate two multi-check order books, wherein each check of each book bears an identical indicium which may be located at one or more locations thereon such as the four corners. The indicium associated with each book is used to identify the waitress using it to record food orders. Thus, the indicium consisting of two oppositely-positioned triangles identifies the waitress using book 10, while the waitress using book 12 is identified by the single circle on each check of book 12. Numeral 14 designates a check with a two-circle indicium, used to identify another waitress. In all other respects check 14 is assumed to be standard and conventional.

In accordance with the teachings of the present invention, while the waitresses are provided with books of checks bearing indicia which are associated with them, the cook or food distributor in the kitchen is provided with sets of flag-like elements, hereafter, referred to as flags. The flags in each set bear the indicium associated with a different waitress. In FIG. 2, to which reference is made herein, flags 21-26 represent flags of different sets. The size of each flag is made large enough so that the indicium carried thereby is easily recognizable from a distance. Each flag preferably includes a pointed end which is used to insert the flag in ordered food such as a sandwich, hamburger, or the like. If desired, the cook may be provided with clips or other fastening means in order to attach a flag to a plate, such as by securing it to the periphery of a plate.

In practicing the novel method of the present invention, the waitress, after entering an order on a check, carrying her indicium, places it at the kitchen counter. After the order is filled, the cook or food distributor does not alert her by calling her name or activating a light which is done in some places. Indeed, the cook need not know the identity of the waitress. Rather, the cook attaches to the plate with the filled order, a flag which carries the same indicium as found on the check, used to determine the food order, placing the filled order with the flag thereon on the check on the pick-up counter. An example of three filled orders with the flags with different indicia, filled from orders on three checks with corresponding indicia is shown in FIG. 3 to which reference is made herein.

The filled orders with the flags located on top of the pick-up counter are easily viewable by the waitresses who need approach the counter only when their respective flags "flag" them down. Also, since the flags are on top of the food and the indicia thereon are clearly distinguishable, the likelihood that waitresses would pick up orders belonging to other waitresses is greatly minimized if not completely eliminated.

Thus, the two major advantages of minimizing confusion and reducing noise, by eliminating the need to call out waitresses names, are achieved. Also, the task of each waitress is eased since she no longer has to approach the counter and study all the checks under the orders to determine if any of the filled orders belongs to her. She approaches the counter only when she is "flagged" by one of her flags which can be determined by periodically glancing at the counter from a distance. Since the flags have to be used on or near prepared food, they are made of a material which is compatible with hygiene and sanitary requirements, such as specially treated plastic, colored with non-poisonous colors. Another advantage realizable with the present invention relates to management operations, requiring the collection of the checks. By using checks which bear waitress's identifying indicia, the collection task is greatly simplified. Also, it eliminates the problem existing in the prior art of determining the waitress who may have filled an unsigned check.

The use of the means and method disclosed herein greatly minimizes jam-ups at the counter pick-up, permitting more rapid and efficient food distribution. Also, it results in a reduction of unnecessary steps of the waitresses which reduces fatigue and consequently, increases efficiency. In addition, the flags and their indicia may be chosen in a plurality of decor-enhancing colors all of which may produce a more pleasant atmosphere, an advantage on which business success so often depends. If desired, each set of flags may include flags of different colors, though bearing the same indicium to identify food preparation requirements, such as well, medium and rare. Thus, such flags would serve as a double purpose, in that they would identify the waitress as well as indicate that the food was prepared as requested.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:

1. In the process of distribution of food in an eatery or the like, the steps comprising:

recording a food order on a form with an order-recorder identifying indicium thereon; and associating with the filled food order a distinct and separate flag-like member, carrying the indicium of the food order-recorder, the indicium on said member being relatively large so as to be viewable from a reasonable distance.

2. In the process of distribution of goods from a source of goods, the steps comprising:

recording ordered goods on a form bearing an indicium related to the order-recorder;

filling the goods in accordance with the record recorded on said form; and associating with the filled order of goods a distinct and separate member, bearing an indicium, related to the indicium on said form, said member being large enough to provide space to bear a relatively large indicium, viewable from a significant distance.

References Cited
UNITED STATES PATENTS

| | | | |
|---|---|---|---|
| 728,649 | 5/1903 | Wyse | 283—60.1 |
| 792,280 | 6/1905 | Nelson | 283—63 A |
| 1,089,154 | 3/1914 | Portmore | 40—2 |
| 1,512,090 | 10/1924 | Hirtz | 40—2 |
| 2,455,007 | 11/1948 | Hayslip | 40—19.5 |
| 3,417,496 | 12/1968 | Von Meyer | 40—2 |

ROBERT W. MICHELL, Primary Examiner

W. J. CONTRERAS, Assistant Examiner